(12) United States Patent
Gascoigne

(10) Patent No.: US 7,946,076 B2
(45) Date of Patent: May 24, 2011

(54) ELECTRIC FISHING DEVICE

(76) Inventor: Jay R. Gascoigne, Presque Isle, WI (US)

( * ) Notice: Subject to any disclaimer, the term of this patent is extended or adjusted under 35 U.S.C. 154(b) by 753 days.

(21) Appl. No.: 11/750,460

(22) Filed: May 18, 2007

(65) Prior Publication Data
US 2008/0282597 A1 Nov. 20, 2008

(51) Int. Cl.
A01K 91/06 (2006.01)
A01K 97/01 (2006.01)
A01K 97/12 (2006.01)
A01K 99/00 (2006.01)

(52) U.S. Cl. .................. 43/4.5; 43/15; 43/16; 43/21
(58) Field of Classification Search .................. 43/1, 4, 43/4.5, 15–17, 21, 26.1
See application file for complete search history.

(56) References Cited

U.S. PATENT DOCUMENTS

| 330,753 | A | | 11/1885 | Gutierrez |
| 2,876,579 | A | | 3/1959 | Plouffe |
| 2,970,400 | A | | 2/1961 | Nolin |
| 3,126,166 | A | | 3/1964 | Weinberg |
| 3,568,352 | A | | 3/1971 | Hill |
| 4,037,326 | A | | 7/1977 | Booth et al. |
| 4,274,219 | A | | 6/1981 | Way |
| 4,344,587 | A | | 8/1982 | Hildreth |
| 4,680,885 | A | * | 7/1987 | Lindell et al. .................. 43/19.2 |
| 4,752,878 | A | | 6/1988 | Sigurdsson et al. |
| 4,790,099 | A | * | 12/1988 | Miller, Jr. .......................... 43/17 |
| 4,887,777 | A | | 12/1989 | Rasmussen |
| 5,056,255 | A | * | 10/1991 | Campbell ....................... 43/19.2 |
| 5,488,796 | A | | 2/1996 | Taylor et al. |
| 5,896,694 | A | | 4/1999 | Midha |
| 6,220,538 | B1 | * | 4/2001 | Durso ............................ 242/250 |
| 6,421,948 | B1 | | 7/2002 | Craig |
| 6,588,137 | B1 | | 7/2003 | Rozkowski |
| 6,685,125 | B1 | | 2/2004 | Tucci |
| 6,880,775 | B1 | | 4/2005 | Wenzel |
| 7,036,267 | B2 | | 5/2006 | Klein |
| 7,086,622 | B1 | | 8/2006 | Whaley |

* cited by examiner

Primary Examiner — David J Parsley

(57) ABSTRACT

An automated fish sensing, reeling, and alarming device, particularly for ice fishing, designed to allow the fisherman to have a hands-free ice-fishing device that will catch fish without monitoring the device at all times. It also will allow a person with a limitation or handicap to enjoy ice fishing, such as some one with arthritis or limited use of upper limbs.

6 Claims, 7 Drawing Sheets

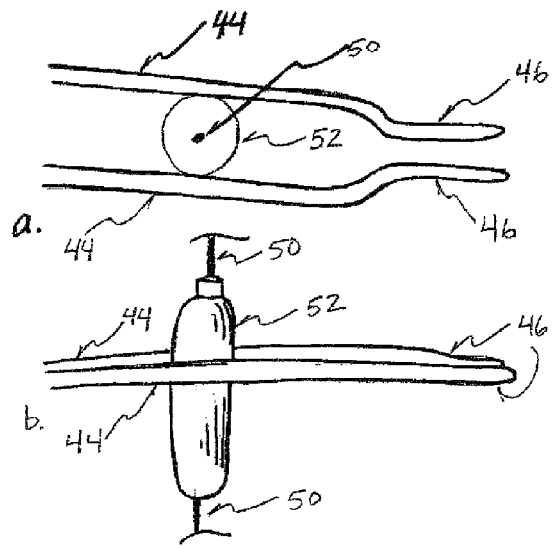
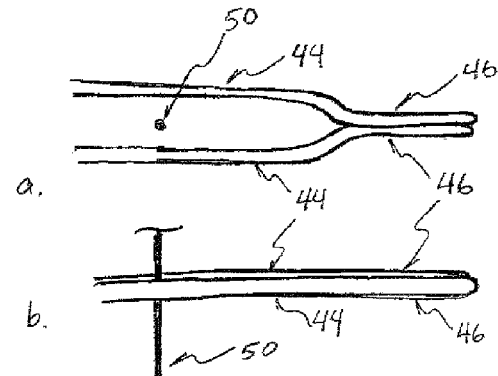
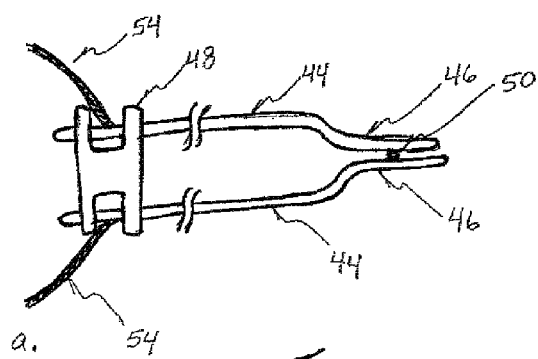
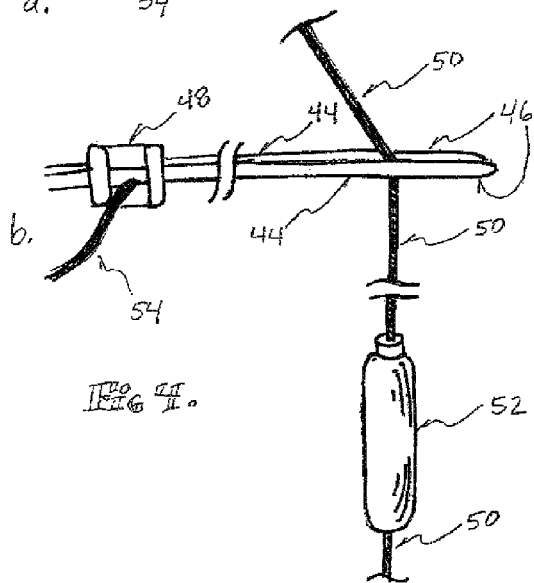

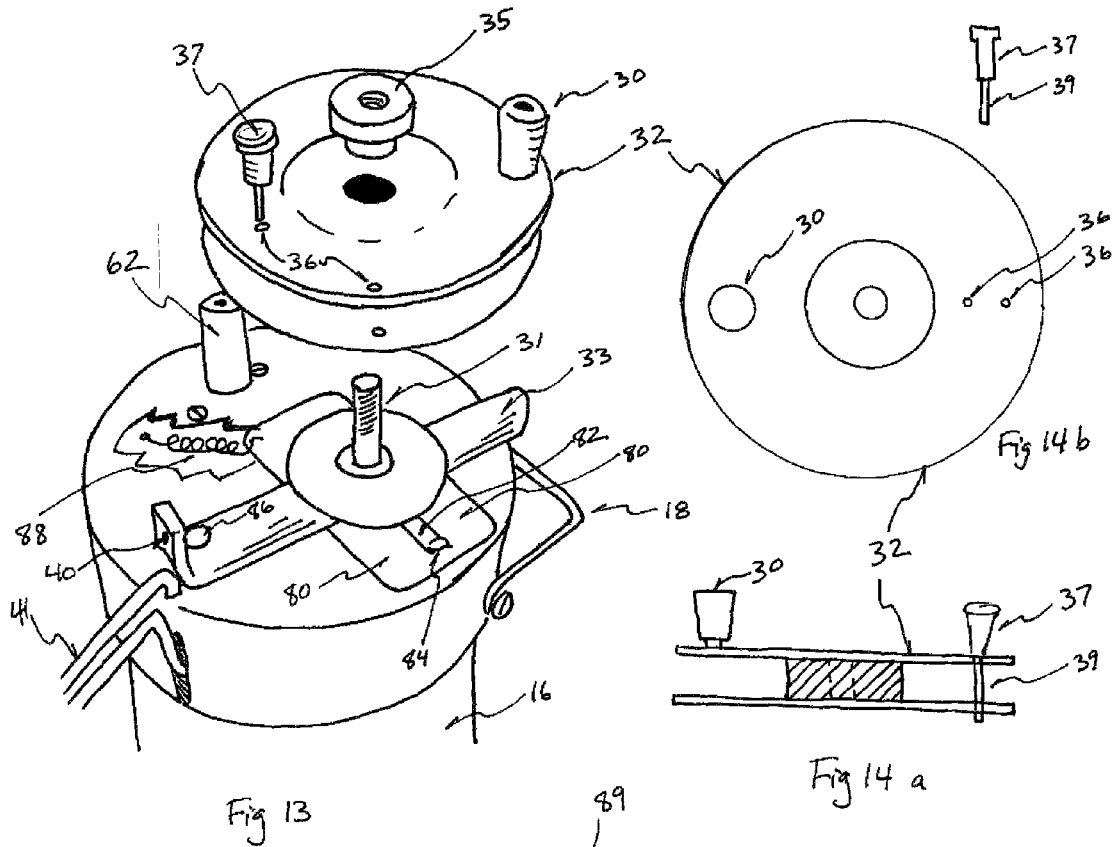
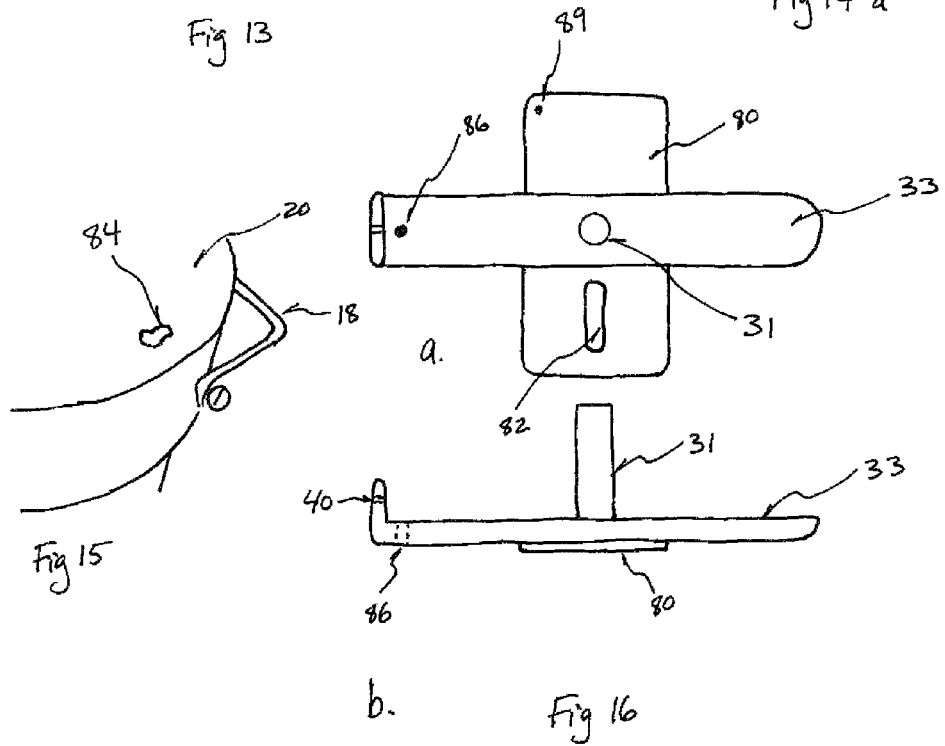

ELECTRIC FISHING DEVICE

BACKGROUND OF THE INVENTION

1. Field of the Invention

The present invention is directed toward fishing equipment. More particularly, it is directed toward an ice fishing apparatus for automating the catching process.

2. Description of the Related Art

The general procedure for ice fishing is to chop, drill or auger a hole in a sheet of ice, supply a fishing pole and line, bait a hook at the end of the line, and wait for fish to take the bait. Many times the fisherman will use a bobber or the like to detect the presence of a fish on the line. Many times there are several fishing holes each with poles and baited lines, ready for the fish to strike.

A popular apparatus for ice fishing is a tip up. Many of times the bobber is hard to see in the ice. The tip up provides an easy visual means for the fisherman to monitor several fishing holes at once.

Due to the extreme environmental conditions encountered in ice fishing, the fisherman may deploy an ice fishing shack or 'ice shanty' for warmth. When this is done the fisherman visits the fishing holes periodically to ascertain wither or not a fish has taken the line.

This can be problematic as the cold blooded fish may not hit the line with the vigor required to actively set the hook, and without a means (such at the fisherman) to start reeling the line, the fish may simply get loose.

Therefore there is a need to actively monitor several fishing holes simultaneously and in such a way as to not require the fisherman to be constantly exposed to the extreme weather conditions that made the ice in the first place. In addition, once a fish is detected on the lined the apparatus can automatically set the hook, reel the fish in, and automatically stop once the fish is secured.

At other times the fisherman may be physically impaired and simply not able to reel the fish in.

There have been several attempts shown in the literature to solve the above framed problems. Below are several of the relevant references.

Pat. No. Des. 330,753 issued to Gutierrez, discloses a combined fishing rod holder and stand. It is similar in design to the present invention with a wide stance and balance which could be centered over an auger hole. It has none of the automated features of the present invention.

U.S. Pat No. 2,876,579 issued to Plouffe, discloses one of the first tip up mechanisms, and can be used as an example of prior art as a trigger mechanism used in ice fishing. The mechanism uses a gear actuated structure to alert a fisherman. It has none of the automated features of the present invention.

U.S. Pat. No. 2,970,400 issued to Nolin, shows an ice fishing apparatus which trigger a flag on the base of a fishing pole. It is actuated when a fish takes the hook and pulls out the line, the reel turns which the releases the finger grips of the reel. It then releases the flag and requires the operator to retrieve the pole and reel in the fish. It has none of the automated features of the present invention.

U.S. Pat. No. 3,126,166 issued to Weinberg, teaches an early instance of an electric drive motor device for use with a fishing reel, This apparatus is attached to an existing spinning reel and is operated by the fisherman. It has none of the automated advantages of the present invention.

U.S. Pat. No. 4,037,326 issued to Booth et al., discloses a downrigger trolling reel, which is quite, a different application, that includes a drive motor which can be controlled to release at a certain depth. It is then actuated by the operator flipping a switch. This however is primarily designed to sense water temperature and release to a give depth as defined by that temperature. It does not have the automated sensing capability of the present invention.

U.S. Pat. No. 4,274,219 issued to Way, discloses a trolling type tackle device in which, once a fish is caught, the sinker release releases the sinker from the fishing line, and the fisherman throws a switch energizing a motor causing the sinker to be reeled in. When the sinker reaches the desired height the switch is automatically opened up stopping the motor. This mechanism does not provide a means for the motor to be triggered by a fish, and is unsuitable for ice fishing.

U.S. Pat. No. 4,344,587 issued to Hildreth, discloses an automatic motorized fishing reel with a frame and a rotating spool. It also includes a sensor which senses the presence of a fish on the line by means of the increase in tension of the line. It also has an automatic clutch for adjusting tension. It still requires manned operation, and does not have the innovative sensing mechanism of the present invention.

U.S. Pat. No. 4,752,878 issued to Sigurdsson et al., is based on a microcontroller which stored a myriad of indices relative to the individual fisherman. Because it is microcontroller based, the delicate electronics are not suited to the cold temperatures found in the ice fishing environment. The comparative simplicity and robustness of the present can be appreciated by those skilled in the art.

U.S. Pat No. 4,887,777 issued to Rasmussen, discloses an ice fishing reel winding device which is push button operated. This invention requires the fisherman to remain by the apparatus to operate it, and therefore defeats the purpose of the fully automated features of the present invention.

U.S. Pat. No. 5,488,796 issued to Taylor et al., discloses a tip up with electronics for signaling the operator. The electronics are activated via a mercury switch. This invention has no way for mounting and supporting a motorized reeling apparatus of the present invention.

U.S. Pat. No. 5,896,694 issued to Midha, shows a tip up with a worm gear mechanism for actuation. It is not remotely similar, but is referenced to show yet another trip mechanism.

U.S. Pat. No. 6,421,948 issued to Craig, discloses a fishing rod holder and signaling device. This particular implementation is poorly balanced such that a fish, of any appreciable size can produce leverage to tip the whole apparatus with the pole headed right into the fishing hole. In addition, there is no automatic reeling, nor suggestions or means to incorporate the features of the present invention.

U.S. Pat. No. 6,588,137 issued to Rozkowski, discloses an ice fishing apparatus with automatic jigging capability. It is hooked to a motor which is switched on by the operator when a fish is detected. It is also IC circuit based, and does not have the capability to detect and reel in a fish without human intervention. All features found in the present invention.

U.S. Pat. No. 6,685,125 issued to Tucci, teaches an ice fishing jig with a self contained power supply which can activate a motor and a light when a fish is detected. Besides appearing unstable, it also requires intervention by an operator after it is set up in order to catch a fish.

DESCRIPTION OF THIS INVENTION (ART)

The present invention is designed to allow the fisherman to have a hands-free ice-fishing device that will catch fish without monitoring the device at all times (unlike the common ice-fishing pole). It allows a person with a physical limitation or handicap to ice-fish, such as some one with arthritis or limited use of upper limbs.

It allows a fisherman to simply operate the device by setting it on the ice next to the fishing hole cut through the ice. After stabilizing the base then setting the bait and hook, and arming the device, the fisherman can then remove him or her self from the proximity of the area to a warmer region. In this manor several ice fishing holes in disparate locations can be actively fished.

The trigger on this device is able to automatically sense the presence of a fish, which under the conditions found in ice fishing may be very sluggish, and not hit the bait with much force at all. Once the presence of the fish is sensed the motor is engaged with sufficient force to set a hook into the fishes mouth, and the fish is then reeled out of the water and up to the tip of the pole assembly, where it automatically stops. All without further intervention from the fisherman.

OBJECTS AND ADVANTAGES

It is an advantage of the present invention to create a substantially automated ice fishing apparatus allowing virtually hands free hooking and retrieving of fish.

It is a further advantage of the present invention to create an electronic sensing means for sensing fish in an ice fishing environment.

It is a further advantage of the present invention to allow fishing at any depth common to ice fishing with the ability to automatically go back to the depth setting where the last fish was caught.

It is a further advantage of the present invention to create an electronic sensing and reeling fishing apparatus that does not need sensitive computer electronics.

It is a further advantage of the present invention to create an electronic sensing and reeling fishing apparatus with a sensitivity adjustment in the fish sensing trigger.

It is a further advantage of the present invention to create an electronic sensing and reeling fishing apparatus which is portable.

It is a further advantage of the present invention to create an electronic fishing device which runs off common battery power, or household current.

It is a further advantage of the present invention to create an electronic sensing and reeling fishing apparatus with an alarm to alert when a fish bites.

It is a further advantage of the present invention to create an electronic sensing and reeling apparatus which is stable in regards to not tipping into an ice fishing hole.

It is a further advantage of the present invention with an embodiment optimized for use in ice holes from 3 inches to 12 inches in diameter.

It is a further advantage of the present invention to create an electronic fishing device which can be set Up in under one minute.

The foregoing has outlined rather broadly the features and technical advantages of this invention so that those skilled in the art may better understand the detailed description that follows.

Those skilled in the art will appreciate that they may readily use the conception and the specific embodiments disclosed as a basis for modifying or designing other structures for carrying out the same purposes of the present invention. Those skilled in the art will also realize that such equivalent constrictions do not depart from the spirit and scope of the invention in its broadest form.

DRAWING FIGURES

FIG. 1 shows a perspective view of a fishing apparatus one embodiment of the current invention;

FIGS. 2a and b show a plan view and perspective view respectively, of trigger assembly in the open or disengaged position;

FIGS. 3a and b show a plan view and a perspective view respectively, of trigger assembly in the closed or engaged position;

FIGS. 4a and b show a plan view and a perspective view respectively, of trigger assembly in the set position, in addition to detail of sensitivity adjustment and communication means attachments;

FIG. 5 shows a side sectional view of the spool and spool engaging assemblies in the engaged and free states;

FIG. 6[a] and b show a top plan view of the spool and spool engaging assemblies in engaged and disengaged position(s) respectively;

Figure 12:
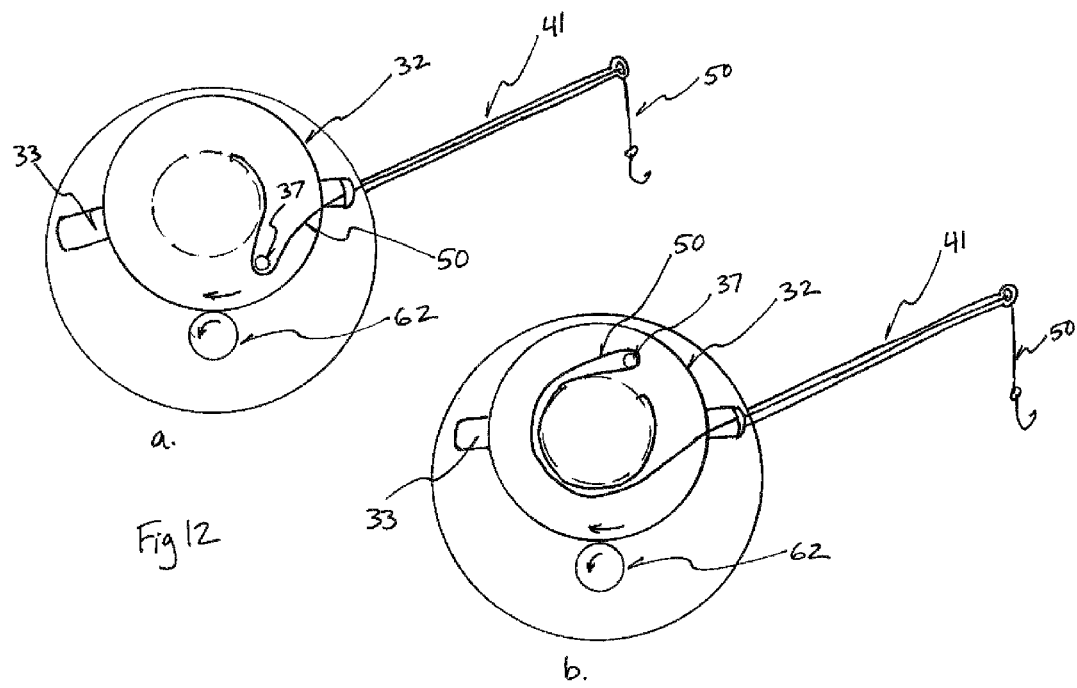

FIG. 12a and b show a top view of the current invention utilizing the depth setting feature;

FIG. 13 shows an exploded view of an embodiment of the current invention;

FIGS. 14a and b show side and top views respectively of detail of the spool;

FIG. 15 shows a top perspective view of the release hook assembly;

FIGS. 16a and b show a top and side view respectively of the spool arm and stable plate assemblies.

DESCRIPTION—FIGS PREFERRED EMBODIMENT

Figure 1:
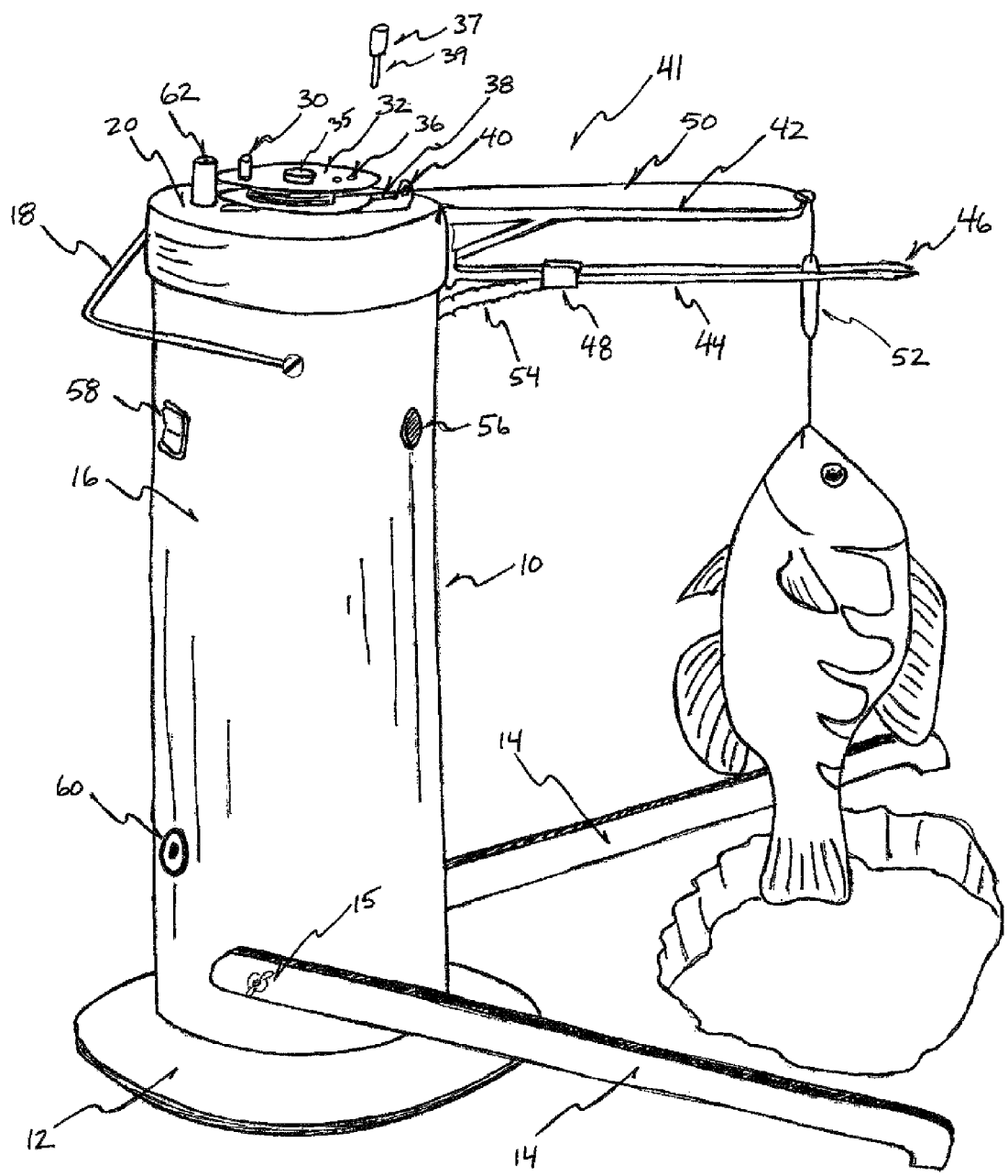

FIG. 1 shows an electric fishing device 1o of one preferred embodiment of the present invention. The base 12 is set near a hole in the ice, which is typically between 3 and 12 inches in diameter with the legs 14, which are attached to the body 16, straddling the hole. A handle 18 of some configuration is provided for ease of transporting. The cap 20 seals the body 16 and provides a platform for spool 32 and pole assembly 41.

FIGS. 2, 3, and 4 show various states of operation for the trigger assembly of the current embodiment of the device. FIG. 4 shows the "set state" while waiting for the fish to take the bait. In this state, the line 50 is pinched between the two trigger actuators 46, each trigger actuator 46 being connected to a respective trigger neck 44 which is connected with an electronic communication means 54 leading to a power source 6o and a motor 61 shown in FIG. 5. The line 50, which separates the trigger actuators 46, serves to keep the electronic switch open and the motor 61 off. The trigger neck 44 is held in place by a switch mount 48, which also serves to set the spacing and assure both sides of the trigger neck 44 remain substantially parallel.

FIG. 3 shows the "engaged state" which is actuated after the fish takes the bait. The line 50 is pulled from between the two trigger actuators 46, and into the space created by the trigger neck 44. This has the effect of allowing the two trigger actuators 46 to connect due to spring tension and close the circuit which actuates the motor 60 to reel in the fish.

FIG. 2 shows the electric fishing device 1o in the "stopped state" which completes the process. In this state the bobber 52, which here-to-fore remained below the trigger neck 44 or trigger actuator 46, is now brought between the two prongs of the trigger neck 44 which opens the circuit to the motor 61 thus stopping the line 50. As can be seen from FIG. 1, the bobber 52 is placed in close proximity with the hook this pulling the fish from the water. In addition the bobber 52 should be designed such that its diameter is slightly larger that the spacing of the trigger neck 44 when in the engaged position (FIG. 3.)

To transport the device from one fishing hole to the next, or for general transportation, the fisherman should assure that the power switch 58 is off. In addition the pole assembly 41 can be rotated and tucked next to the body 16. The legs 14 can also be rotated about the leg mounting 15 and tucked away. The unit is now ready for transport or storage.

To set up the base 12 is set into position and stabilized by rotating the legs 14 down parallel to the surface of the ice and tightening the legs 14 in place at the leg mounting 15. With the legs 14 straddled on either side of the ice hole, the device cannot be pulled over when the fish bites and puts pressure on the line 50.

The device is readied for use by moving the spool arm 33, shown in FIG. 6a, from the engaged position, where the driver wheel 62 is engaged with the spool 32, and the stable plate 80 is free from the release hook 84; to the free spool position as shown in FIG. 6b, such that the driver wheel 62 is disengaged from the spool 32 by lifting the spool arm 33 and rotating it sufficient to hook the disengagement lock receiver 82 to the release hook 84. The spool 32 will rotate freely at that point.

To set the desired depth for fishing, the fisherman now pulls the line stop peg 37 from the line peg hole 36 as best illustrated in FIG. 13 and releases enough line 50 to reach the desired depth determined for optimal fishing. Once the line 50 depth is set, the line stop peg 37 is reinserted into the line peg hole 36 such that the stop pin 39 extends through the spool as shown in FIG. 14a. The spool is then moved to the engaged position. When the motor is activated, the spool then turns in the same direction as the spool is wound such that the stop pin 39 gathers the line 50 and wraps it around the spool 32 as shown in FIGS. 12a and 12b. To redeploy the line, the fisherman now simply moves the apparatus to the free spool position where the line 50 automatically unwinds to the desired depth.

When a fish bites the hook, it trips the trigger actuator 46 by pulling the line 50 from between the trigger actuators 46 which closes the circuit and sets an alarm 56 to alert the fisherman. Simultaneously with the alarm 56, a motor 61 switches on which actuates a driver wheel 62 which in turn engages a spool 32 which reels in a line 50 and sets a hook into the fishes mouth and commences to retrieve the fish to the surface through the ice hole.

When the fish has been retrieved, the bobber 52 passes through the trigger neck 44. The bobber 52 is designed such that the diameter of the barrel is slightly larger than the spacing between the two arms of the trigger neck 44 thus separating the two nodes of the trigger actuator 46 at the distal end of the trigger neck 44. As the nodes are separated, the motor 61 and other electronics such as alarms 56 are switched off leaving the fish at the tip of the pole 42 ready to be unhooked. Then simply reset for the next catch.

Figure 5:
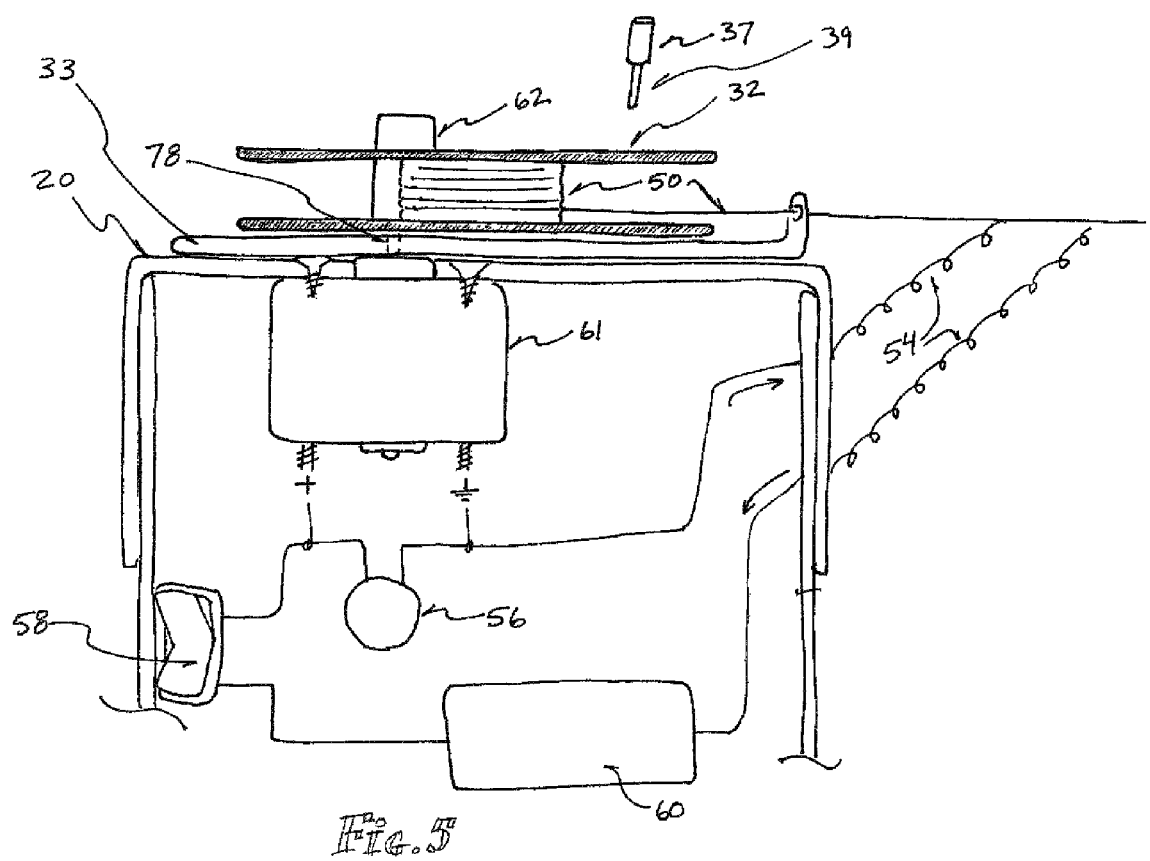

FIG. 5 indicates one possible wiring configuration. The power source 60, which can be a battery, line and transformer, rechargeable battery, or the like; is connected through power switch 58 to a node to both one pole of the motor 61 and the alarm 56 then in common through one pole of the communication means 54, typically a wires, through the trigger neck 44, trigger actuator 46 and back through a separate communication means and to the opposite pole of the power supply 60. in order for the motor 61 and alarm 56 to operate, both the power switch 58 and the trigger actuator 46 must be in the closed position. The alarm 56 can be any combination of speaker (audio), lights (visual) and or radio frequency (rf) communication devices. It will be apparent to one skilled in the art that there are many equivalent ways to implement the wiring and electronics including microcontroller, or microprocessor means.

The bobber 52 sits directly below the pole assembly 41 with a hook below that. To set the trigger mechanism the fisherman simply pulls out the line to the desired depth. Then put the line stop peg 37 into a line peg hole 36 in the top of the spool 32. The peg allows fisherman to go back to the same depth every time.

Figure 6:
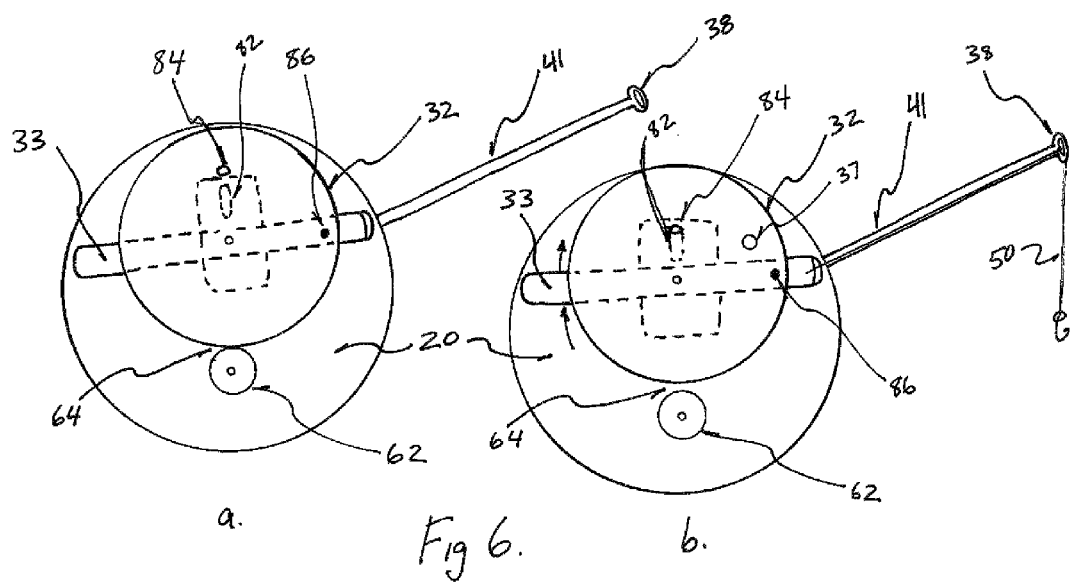

FIG. 6 shows the coupling means between the motor 61 and the spool 32. When fishing it is desired that the line 50 be able to have some give or drag on the line. If not, the force of a fish pulling away may snap the line. Therefore, a preferred coupling between the motor 61 and a spool 32 will incorporate drag in the form of a friction based mechanism. The driver wheel 62 may be rubberized, or surrounded by surgical tubing to grip the spool 32. The motor can also be engaged with the spool through gearing; spur gears, worm gears and the like. In addition, springs (88) can be used provide a constant engagement pressure between the driver wheel 62 and the spool 32.

Figure 7:
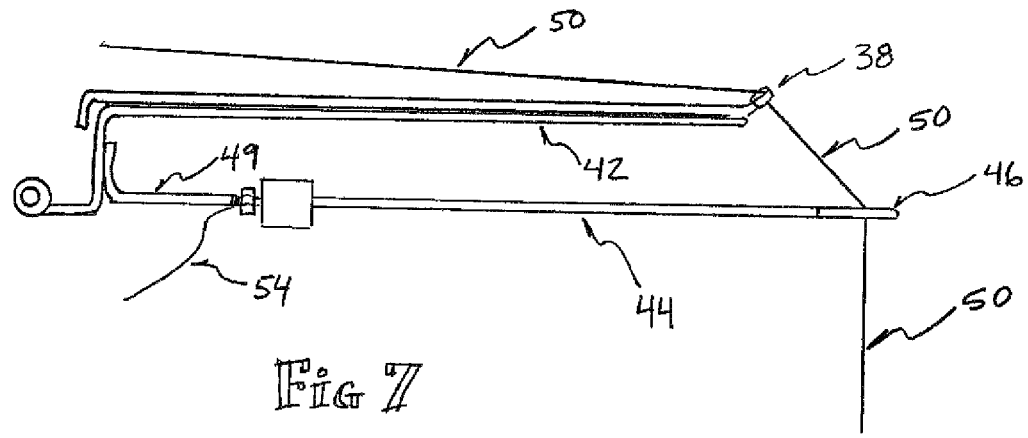
FIG. 7 shows a side view of the pole assembly with sensitivity at a high setting.
Figure 8:
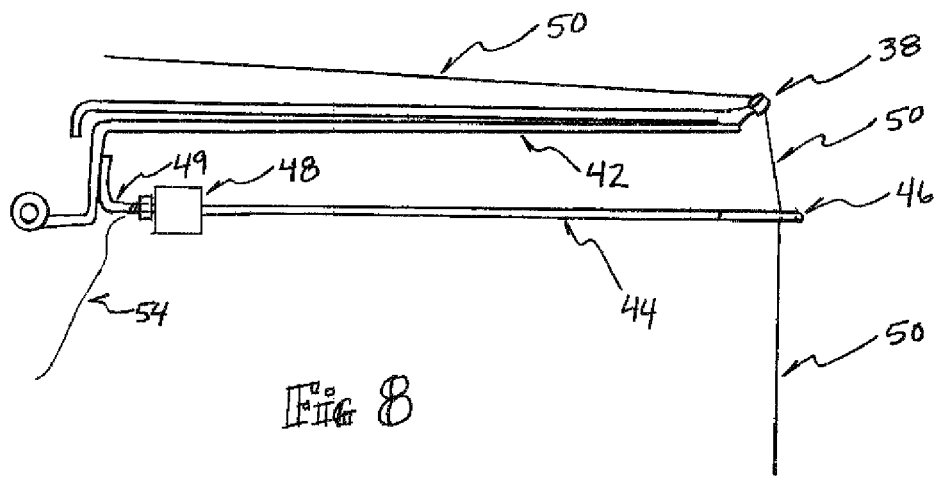
FIG. 8 shows a side view of the pole assembly with sensitivity at a low setting.
Figure 9:
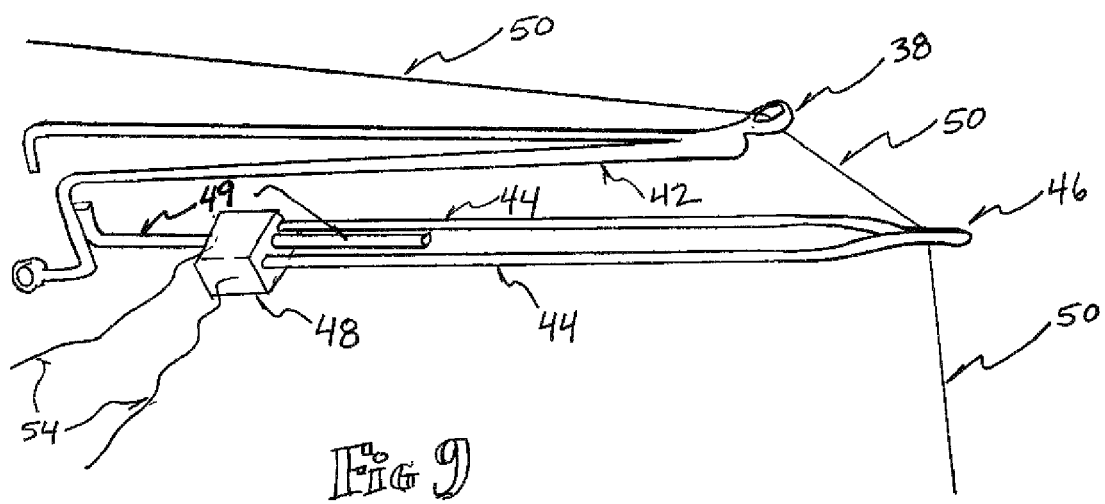
FIG. 9 shows a perspective view of the pole assembly highlighting the sensitivity adjustment.

FIGS. 7, 8, and 9, detail the sensitivity mechanism for one embodiment of the present invention. The sensitivity is largely set by the angle or theta between the line 50 between the eyelet 38 and the trigger actuator 46. The larger the value of theta, the more sensitive being released from the set state to the engaged state, thus hooking and reeling the fish. In FIG. 9, the sensitivity adjustment 49 detail is shown. The switch mount 48 can be slid along the sensitivity adjustment 49 to change the effective length and position of the trigger actuator 46 relative to the eyelet 38, which remains relatively constant. By making the communication means 54 somewhat flexible, the switch mount can be easily moved along the sensitivity adjustment 49.

DESCRIPTION—FIGS ADDITIONAL EMBODIMENTS

Figure 10:
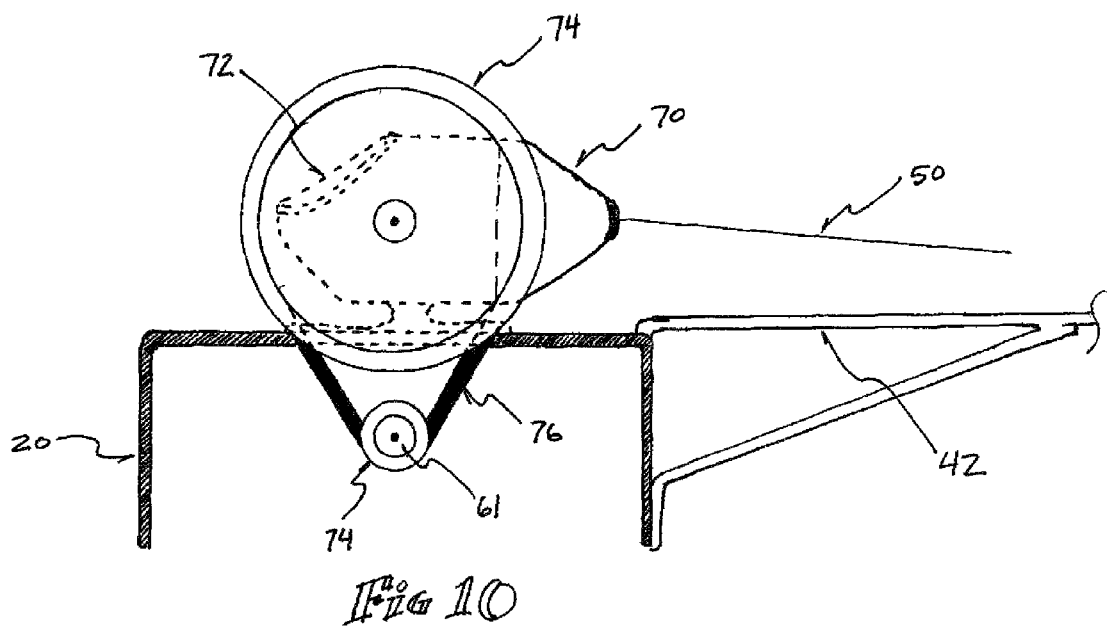
FIG. 10 shows a side view of the pole assembly of an alternative embodiment.
Figure 11:
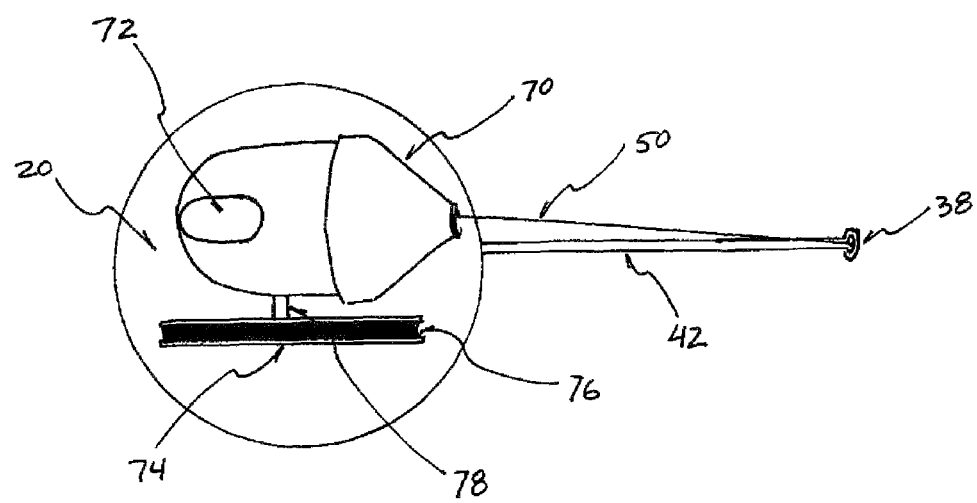
FIG. 11 shows a top view of the pole assembly of an alterative embodiment.

FIGS. 10 and 11, show at least one alternative embodiment of the present invention involving a reel 70, such as a close faced reel made by Zebco® having a push button release 72. In this embodiment, the motor 61 and the reel 70 are coupled using two pulleys 74 connected through a belt 76. In yet other embodiments, the presence of the fish near the pole can be detected due to interrupting a beam located at the trigger.

CONCLUSION, RAMIFICATIONS, AND SCOPE

Thus the reader will see that the automatic sensing and reeling features of the present invention provide a greater degree of utility over the prior methods, both alone, or any obvious combination thereof While the above description contains many specificities including the disclosure of a preferred embodiment designed to satisfy best mode requirements of 35 U.S.C. 112 paragraph 1. These should not be construed as limitations on the scope of the invention, but rather as an exemplification of one preferred embodiment with several additional modes designed to better teach the broader concept thereof. Many other variations are possible, For example various sensing or drive elements can be mixed or combined to form new arrangements. Accordingly, the scope of the invention should be determined not by the embodiment(s) illustrated, but by the appended claims and their legal equivalents.

We claim:

1. A method for virtually hands-free ice fishing using an electronic fishing device having a base, a body, legs, leg mountings for mounting the legs to the body, a spool for reeling lengths of fishing line with a hook the spool being operationally connected with a motor, the motor being connected to a power source through a power switch, a pole assembly, a trigger neck, a trigger actuator comprising two substantially parallel conductive rods in electronic communication with the power source and the motor, comprising:
  (a) making a hole in ice which is over a body of water,
  (b) securing the electric fishing device near the hole such that the pole assembly, integrated with the electronic fishing device, is substantially over the center of the hole,
  (c) baiting the hook
  (d) unreeling the line with the bait and hook to the desired depth,
  (e) setting the trigger actuator at the end of the trigger neck,
  (f) turning the power switch to the on position,
  (g) waiting for a fish to bite the hook causing a substantially closed circuit through the trigger actuator to activate the motor coupled with the spool in such a way as to set the hook and reel-in the line;
  (h) providing a means for sensing when said fish reaches proximity with the pole assembly and deactivating said motor by separating the two substantially parallel conductive rods which opens the substantially closed circuit through the trigger acuator.

2. A method for ice fishing in accordance with claim 1 wherein said means for detecting the presence of a fish is adjusted for sensitivity.

3. The method for ice fishing in accordance with claim 1 wherein the step of unreeling the line with the bait and hook to the desired depth further comprises inserting a stop peg into the spool for reeling lengths of fishing line.

4. The method for ice fishing in accordance with claim 1 wherein coupling between the spool and the motor is in the form of a friction based mechanism comprising a driving wheel.

5. The method for ice fishing in accordance with claim 4 wherein springs are used to provide constant engagement pressure between the driving wheel and the spool.

6. A virtually hands free method for automatically detecting the presence of, and reeling, a fish hooked on a line which extends over and into a body of water; the method includes; providing a housing, a means for stabilizing the housing relative to the body of water, a pole for extending the line over the body of water, a fishing reel comprising a spool mounted to rotate on the housing and aligned tangentially with the pole, the line being wound onto the spool, a motor assembly including an electric motor connected to a battery and a coupler to communicate between the motor output and the spool, and a hook with bait on the distal end of the line improvement comprising:
  (a) placing a fishing line between two separate substantially parallel substantially conductive rods in such a way as to separate said rods forming an open circuit,
  (b) placing the distal end of the line, having the hook with bait in the vicinity of at least one fish,
  (c) waiting for at least one fish, in the vicinity of said fishing line, to attach to said fishing line this removing said fishing line from between said rods and closing said circuit,
  (d) the closing of said circuit activating a motor having been coupled with a fishing reel and commencing a reeling activity,
  (e) having a bobber having a diameter slightly larger than the spacing between said rods and proximal to the location of the fish,
  (f) as the reeling activity progresses, said bobber moving proximally to and wedging between said conductive rods causing said circuit to open and said reeling activity to stop.

* * * * *